United States Patent
Murata

(10) Patent No.: US 10,982,580 B2
(45) Date of Patent: Apr. 20, 2021

(54) EXHAUST HEAT RECOVERY STRUCTURE

(71) Applicant: TOYOTA JIDOSHA KABUSHIKI KAISHA, Toyota (JP)

(72) Inventor: Toshio Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 25 days.

(21) Appl. No.: 16/012,130

(22) Filed: Jun. 19, 2018

(65) Prior Publication Data

US 2019/0010849 A1 Jan. 10, 2019

(30) Foreign Application Priority Data

Jul. 10, 2017 (JP) .............................. JP2017-134930

(51) Int. Cl.
| | | |
|---|---|---|
| *F01N 3/28* | (2006.01) | |
| *F01N 3/22* | (2006.01) | |
| *F01N 5/02* | (2006.01) | |
| *F02G 5/02* | (2006.01) | |

(52) U.S. Cl.
CPC .......... *F01N 3/2889* (2013.01); *F01N 3/227* (2013.01); *F01N 5/02* (2013.01); *F02G 5/02* (2013.01); *F01N 2240/02* (2013.01); *F01N 2240/36* (2013.01); *F01N 2410/03* (2013.01)

(58) Field of Classification Search
CPC ............. F01N 2240/02; F01N 2240/36; F01N 2410/03; F01N 3/227; F01N 3/2889; F01N 5/02; F02G 5/02
See application file for complete search history.

(56) References Cited

U.S. PATENT DOCUMENTS

| | | | |
|---|---|---|---|
| 6,942,027 B2 * | 9/2005 | Klotten | F01N 3/005 165/103 |
| 2003/0106683 A1 | 6/2003 | Klotten et al. | |
| 2004/0251012 A1 * | 12/2004 | Bush | F28F 27/02 165/81 |
| 2008/0066886 A1 * | 3/2008 | Mabuchi | B60K 13/04 165/67 |
| 2010/0043413 A1 * | 2/2010 | Orihashi | F01N 3/02 60/320 |
| 2011/0131961 A1 * | 6/2011 | Lee | F01M 5/001 60/320 |
| 2011/0131962 A1 | 6/2011 | Toi et al. | |

(Continued)

FOREIGN PATENT DOCUMENTS

| | | |
|---|---|---|
| EP | 2 952 705 A1 | 12/2015 |
| EP | 3 109 428 A1 | 12/2016 |

(Continued)

*Primary Examiner* — Phutthiwat Wongwian
*Assistant Examiner* — Diem T Tran
(74) *Attorney, Agent, or Firm* — Oblon, McClelland, Maier & Neustadt, L.L.P.

(57) ABSTRACT

In an exhaust heat recovery structure, a heat exchange portion (a tubular part) is configured such that a height of a lower inner surface is lowered from an inlet toward an outlet. Hence, when exhaust gas is condensed and condensed water is thereby generated inside the heat exchange portion (the tubular part), the condensed water flows from the inlet side toward the outlet side where the lower inner surface is lowered, and is then discharged to a piping part. Accordingly, the condensed water is unlikely to be collected inside the heat exchange portion.

9 Claims, 11 Drawing Sheets

(56) References Cited

U.S. PATENT DOCUMENTS

| | | | |
|---|---|---|---|
| 2015/0027666 A1* | 1/2015 | Hisanaga | F28D 7/1684 |
| | | | 165/100 |
| 2015/0354438 A1 | 12/2015 | Shinpo et al. | |
| 2016/0186625 A1 | 6/2016 | Oya et al. | |
| 2016/0376970 A1 | 12/2016 | Murata et al. | |
| 2017/0074142 A1* | 3/2017 | Janssens | F28F 13/06 |

FOREIGN PATENT DOCUMENTS

| | | |
|---|---|---|
| JP | 2008-57393 A | 3/2008 |
| JP | 2014-095362 | 5/2014 |
| WO | WO 2010/015940 A2 | 2/2010 |

\* cited by examiner

EXHAUST HEAT RECOVERY STRUCTURE

CROSS-REFERENCE TO RELATED APPLICATIONS

The disclosure of Japanese Patent Application No. 2017-134930 filed on Jul. 10, 2017 including the specification, drawings and abstract is incorporated herein by reference in its entirety.

BACKGROUND

1. Technical Field

The present disclosure relates to an exhaust heat recovery structure.

2. Description of Related Art

Japanese Patent Application Publication No. 2014-095362 discloses an exhaust heat recovery system including a heat exchange portion (an exhaust heat recovery tubular part) that carries out heat exchange between exhaust gas flowing in from an exhaust pipe part and a coolant liquid, and allows the exhaust gas after being heat-exchanged with the coolant liquid to flow out to the exhaust pipe part. In the heat exchange portion disclosed in JP 2014-095362 A, coolant flow passages through which the coolant liquid flows and gas flow passages through which the exhaust gas flows are alternately arranged.

SUMMARY

In this case, in the exhaust heat recovery system of JP 2014-095362 A, the heat exchange portion is arranged in a substantially horizontal manner. Hence, when the exhaust gas is condensed and condensed water is thereby generated inside the heat exchange portion, the condensed water stagnates, and is thus likely to be collected inside the heat exchange portion. In particular, condensed water collected in the gas flow passages of the heat exchange portion deteriorates the heat exchange efficiency.

In light of the above facts, the present disclosure provides an exhaust heat recovery structure suppressing condensed water from being collected inside a heat exchange portion.

According to one aspect of the present disclosure, provided is an exhaust heat recovery structure including an exhaust pipe and a heat exchange portion. The exhaust pipe is configured to allow exhaust gas flowing from an engine to flow through the exhaust pipe. The heat exchange portion is structured to have an inlet and an outlet which communicate with the exhaust pipe, and to have a lower inner surface whose height is lowered from one toward the other of the inlet and the outlet. The heat exchange portion is configured to carry out heat exchange between the exhaust gas flowing in from the exhaust pipe through the inlet with a heating medium, and to bring the exhaust gas after being heat-exchanged with the heating medium to flow out through the outlet to the exhaust pipe.

The "configuration to have a lower inner surface whose height is lowered from one to the other of the inlet and the outlet" includes a "configuration to have a lower inner surface whose height is lowered from the inlet toward the outlet", and a "configuration to have a lower inner surface whose height is lowered from the outlet toward the inlet".

The "lower inner surface of the heat exchange portion" denotes a "lower surface which locates inside of the heat exchange portion".

According to the above-described exhaust heat recovery structure, the exhaust gas from the engine flows through the exhaust pipe. Through the inlet that communicates with the exhaust pipe, the exhaust gas having flowed from the exhaust pipe into the heat exchange portion is subjected to the heat exchange with the heating medium. The exhaust gas after being heat-exchanged with the heating medium flows out through the outlet of the heat exchange portion into the exhaust pipe.

In this case, in the exhaust heat recovery structure, the height of the lower inner surface of the heat exchange portion is set to be lowered from one to the other of the inlet and the outlet. Hence, if the exhaust gas is condensed and condensed water is thereby generated inside the heat exchange portion, the condensed water flows from one of the inlet and the outlet toward the other of the inlet and the outlet, the other at which the height of the lower inner surface is lowered, and is then discharged to the exhaust pipe. Accordingly, the condensed water becomes unlikely to be collected inside the heat exchange portion.

In the above exhaust heat recovery structure, the heat exchange portion may be arranged at a lateral position of the exhaust pipe. A lower surface of a communication part in the exhaust pipe may be disposed more downward than a lowermost portion of the other of the inlet and the outlet, the communication part communicating with the other of the inlet and the outlet.

The "lowermost portion" denotes a "portion located at a lowermost position". "The other" denotes either of the inlet or the outlet at which the height of the lower inner surface is lowered, in the heat exchange portion.

According to the exhaust heat recovery structure, in the exhaust pipe, the lower surface of the communication part communicating with the other of the inlet and the outlet of the heat exchange portion is disposed more downward than the lowermost portion of the other of the inlet and the outlet. Accordingly, the condensed water is likely to flow from the other of the inlet and the outlet of the heat exchange portion to the exhaust pipe; therefore, the condensed water is unlikely to be collected inside the heat exchange portion including the lowermost portion of the other of the inlet and the outlet.

In the exhaust heat recovery structure, the heat exchange portion may be arranged at a lateral position of the exhaust pipe. A height of an upper outer surface of the heat exchange portion may be lowered from the one toward the other of the inlet and the outlet, and the heat exchange portion may include an actuator disposed on the upper outer surface at a position closer to the other of the inlet and the outlet of the heat exchange portion. The actuator may be configured to operate a changeover valve configured to change over a flow condition of the exhaust gas between a condition in which the exhaust gas flows through the exhaust pipe and a condition in which the exhaust gas flows through the heat exchange portion.

The "upper outer surface of the heat exchange portion" denotes an "upper outer (outside) surface of the heat exchange portion", that is, an "upper surface which locates outside of the heat exchange portion".

According to the exhaust heat recovery structure, the actuator is disposed on the upper outer surface on the other side of the heat exchange portion. Here, since the height of the upper outer surface at a position closer to the other (on the other side) of the heat exchange portion is lower than the height of the upper outer surface at a position closer to the one (on the one side) thereof, a space is formed above the upper outer surface on the other side. The space above the upper outer surface on the other side can be utilized for placing the actuator therein, to thus enhance the space efficiency.

In the exhaust heat recovery structure, the heat exchange portion may be arranged at a lateral position of the exhaust pipe. A height of a lower outer surface of the heat exchange portion may be lowered from the one toward the other of the inlet and the outlet, and the heat exchange portion may include an actuator disposed on the lower outer surface at a position closer to the one of the inlet and the outlet of the heat exchange portion. The actuator may be configured to operate a changeover valve configured to change over a flow condition of the exhaust gas between a condition in which the exhaust gas flows through the exhaust pipe and a condition in which the exhaust gas flows through the heat exchange portion.

Note that the "lower outer surface of the heat exchange portion" denotes a "lower outer (outside) surface of the heat exchange portion", that is, a "lower surface which locates outside of the heat exchange portion".

According to the exhaust heat recovery structure, the actuator is disposed on the lower outer surface on the one side of the heat exchange portion. In this case, the height of the lower outer surface on the one side of the heat exchange portion is higher than the height of the lower outer surface on the other side thereof, and thus the space is formed below the lower outer surface on the one side. The space below the lower outer surface on the one side can be utilized for placing the actuator therein, to thus enhance the space efficiency.

In the exhaust heat recovery structure, the changeover valve may be disposed in a communication part in the exhaust pipe, the communication part communicating with the one of the inlet and the outlet, and may be configured to change over a flow condition of the exhaust gas between a condition in which the exhaust gas flows through the exhaust pipe and a condition in which the exhaust gas flows through the heat exchange portion. Alternatively, there may be provided a changeover valve disposed in a communication part in the exhaust pipe, the communication part communicating with the one of the inlet and the outlet, and the changeover valve being configured to change over a flow condition of the exhaust gas between a condition in which the exhaust gas flows through the exhaust pipe and a condition in which the exhaust gas flows through the heat exchange portion.

According to the exhaust heat recovery structure, the changeover valve is disposed in the communication part in the exhaust pipe, the communication part communicating with the one of the inlet and the outlet. In this case, since the height of the lower inner surface at the one of the inlet and the outlet of the heat exchange portion is higher than that at the other of the inlet and the outlet of the heat exchange portion, the condensed water is unlikely to flow from the one of the heat exchange portion to the communication part in the exhaust pipe communicating with the one of the inlet and the outlet. Hence, the changeover valve disposed in the communication part is unlikely to be corroded by the condensed water.

In the above exhaust heat recovery structure, a height of the heat exchange portion may be lowered from the inlet toward the outlet.

According to the above exhaust heat recovery structure, if the exhaust gas is condensed and condensed water is thereby generated inside the heat exchange portion, the condensed water flows from the inlet toward the outlet at which the height of the lower inner surface is lowered, and is then discharged to the exhaust pipe. Since the flow direction of the condensed water in the heat exchange portion and the flow direction of the exhaust gas in the heat exchange portion are the same direction, the condensed water generated inside the heat exchange portion is likely to be discharged by the flow of the exhaust gas. Hence, the condensed water is unlikely to be collected inside the heat exchange portion.

Furthermore, in the above exhaust heat recovery structure, a height of the heat exchange portion may be lowered from the outlet toward the inlet.

According to the exhaust heat recovery structure, if the exhaust gas is condensed and condensed water is thereby generated inside the heat exchange portion, the condensed water flows from the outlet toward the inlet at which the height of the lower inner surface is lowered, and is then discharged to the exhaust pipe. In this case, the condensed water generated on the upstream side in the flow direction of the exhaust gas in the heat exchange portion flows toward the inlet located upstream in the flow direction, which is closer to the condensed water generation position, and is discharged through the inlet into the exhaust pipe. Hence, compared with the case in which the condensed water flows toward the outlet, the condensed water generated on the upstream side in the flow direction of the exhaust gas in the heat exchange portion is likely to be discharged to the exhaust pipe. Accordingly, in the exhaust heat recovery structure according to claim 7, in particular, the condensed water generated on the upstream side in the flow direction of the exhaust gas in the heat exchange portion is unlikely to be collected inside the heat exchange portion.

The present disclosure is configured as described above, to thus attain such an excellent effect that the condensed water is unlikely to be collected inside the heat exchange portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
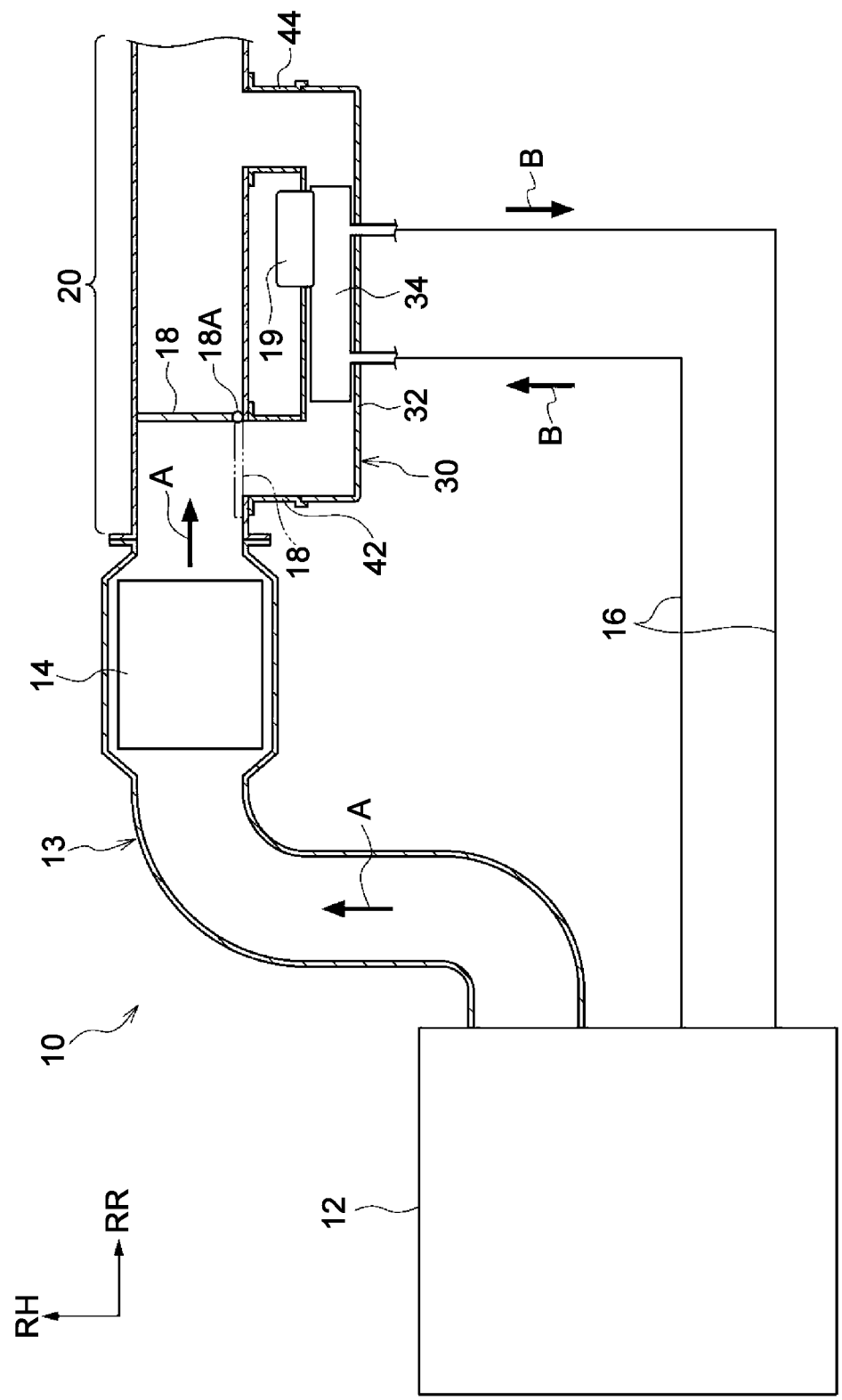
FIG. 1 is a view schematically showing an outline structure of an exhaust heat recovery structure according to a first embodiment.

Hereinafter, one example of an embodiment according to the present disclosure will be described with reference to the drawings. An arrow RR, an arrow RH, and an arrow UP appropriately shown in the drawings indicate a rearward direction, a rightward direction, and an upward direction, respectively. Note that these directions are appropriately defined simply for convenience of explanation, and thus directions of an exhaust heat recovery structure 10 are not limited to these directions. A longitudinal direction, rightward and leftward directions, and upward and downward directions used in the following description may or may not coincide with a longitudinal direction, rightward and leftward directions, and upward and downward directions of a vehicle to which the exhaust heat recovery structure 10 is applied. An upstream side and a downstream side in a gas flow direction of exhaust gas are sometimes referred to simply as an "upstream side" and a "downstream side".

Description will be started with a configuration of the exhaust heat recovery structure 10 according to the first embodiment. FIG. 1 shows the exhaust heat recovery structure 10.

The exhaust heat recovery structure 10 is a structure to collect heat of exhaust gas flowing from an engine 12 of a vehicle, such as an automobile, through heat exchange with a coolant liquid (one example of a heating medium) in a heat exchange portion 30 described later. The heat collected by the exhaust heat recovery structure 10 is used, as one example, for promotion of warm-up of the engine 12, and others.

Specifically, as shown in FIG. 1, the exhaust heat recovery structure 10 includes an exhaust pipe 13, the heat exchange portion 30, a front combined part 42, and a rear combined part 44.

The exhaust pipe 13 is composed by a cylindrical pipe extending in the longitudinal direction. A front end of the exhaust pipe 13 is connected to the engine 12. With this, exhaust gas from the engine 12 flows in from the front end of the exhaust pipe 13 toward the rearward direction. In FIG. 1, a gas flow direction through which the exhaust gas flows is indicated by arrows A.

The exhaust pipe 13 includes a piping part 20 in a pipe shape composing a part of the exhaust pipe. The piping part 20 is formed, as one example, into a pipe shape by joining members divided (e.g. divided into two) in the circumferential direction of the piping part 20 via welding or the like. Various shapes such as a circular shape and a rectangular shape may be employed as an outer shape of the piping part 20, and in the present embodiment, the outer shape is formed to be a circular shape, as one example (see FIG. 4).

On the upstream side of the piping part 20 in the exhaust pipe 13, a catalytic converter 14 is provided, as shown in FIG. 1. The catalytic converter 14 has a function to remove particular substances from exhaust gas passing through the catalytic converter 14 so as to purify the exhaust gas.

Figure 2:
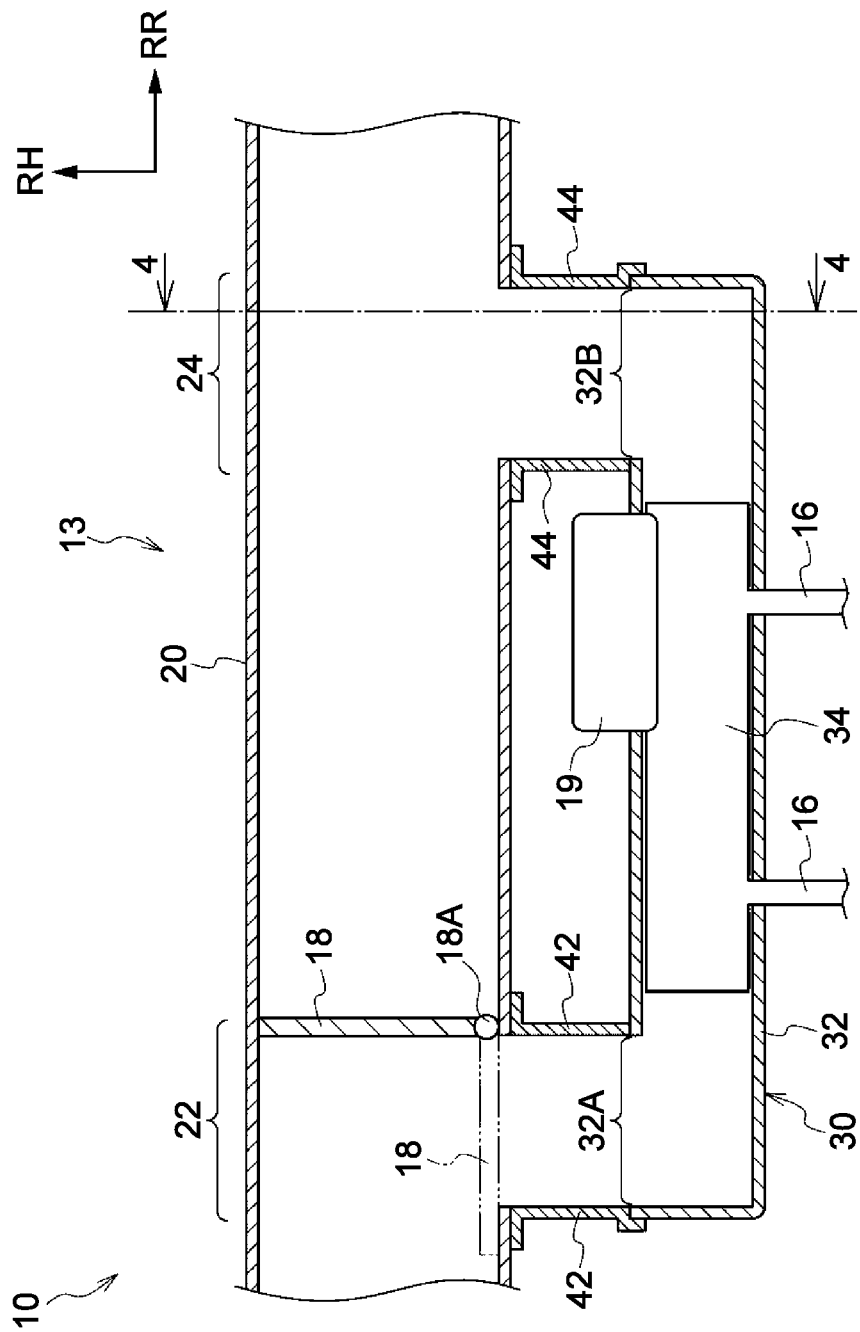
FIG. 2 is a plan sectional view schematically showing the exhaust heat recovery structure according to the first embodiment.

The heat exchange portion 30 has a function to carry out heat exchange between the exhaust gas and a coolant liquid (one example of a heating medium). As shown in FIG. 2, the heat exchange portion 30 is disposed at a leftward position (one example of a lateral position) of the piping part 20 of the exhaust pipe 13. Specifically, the heat exchange portion 30 includes a tubular part 32 disposed at a leftward position of the piping part 20, and a heat exchanger 34 disposed inside the tubular part 32.

The tubular part 32 is formed, as one example, into a pipe shape by joining members divided (e.g. divided into two) in the circumferential direction of the tubular part 32 via welding or the like. Various shapes such as a circular shape and a rectangular shape may be employed as an outer shape of the tubular part 32, and in the present embodiment, the outer shape is formed to be a rectangular shape, as one example (see FIG. 4).

In addition, as shown in FIG. 2, the tubular part 32 includes an inlet 32A allowing the exhaust gas to flow into the inside and an outlet 32B allowing the exhaust gas to flow out from the inside. The inlet 32A and the outlet 32B of the tubular part 32 communicate respectively with an upstream section 22 and a downstream section 24 in the piping part 20 of the exhaust pipe 13. Specifically, the inlet 32A of the tubular part 32 is connected via the front combined part 42 to a lateral part of the upstream section 22 in the piping part 20. The outlet 32B of the tubular part 32 is connected via the rear combined part 44 to a lateral part of the downstream section 24 in the piping part 20. That is, the tubular part 32 is connected in parallel to the piping part 20 so as to compose an exhaust passage bypassing the piping part 20. The tubular part 32 and the piping part 20 are disposed under a floor of the vehicle.

The front combined part 42 is formed, as one example, into a pipe shape by joining members divided (e.g. divided into two) in the circumferential direction of the front combined part 42 through welding or the like. Various shapes such as a circular shape and a rectangular shape may be employed for an outer shape of the front combined part 42, and in the present embodiment, the outer shape is formed to be a rectangular shape, as one example.

As with the front combined part 42, the rear combined part 44 is formed, as one example, into a pipe shape by joining members divided (e.g. divided into two) in the circumferential direction of the rear combined part 44 via welding or the like. Various shapes such as a circular shape and a rectangular shape may be employed as an outer shape of the rear combined part 44, and in the present embodiment, the outer shape is formed to be a rectangular shape, as one example (see FIG. 4).

As shown in FIG. 2, the heat exchanger 34 is disposed at an intermediate position in a gas flow direction inside the tubular part 32. This heat exchanger 34 is provided with a gas flow passage (not illustrated) extending through the heat exchanger 34 in the longitudinal direction and allowing the exhaust gas to flow therethrough. In addition, coolant circulating passages 16, which allow the coolant liquid to flow between the inside of the heat exchanger 34 and the engine 12, are connected to the heat exchanger 34. By operation of a not-illustrated water pump driven by power of the engine 12, as shown in FIG. 1, the coolant liquid circulates inside the coolant circulating passages 16 (in FIG. 1, a flow of the coolant liquid is indicated by arrows B). Through this, the heat exchanger 34 is configured to collect heat of the exhaust gas with the coolant liquid through heat exchange between the exhaust gas and the coolant liquid, and utilize the heat for promotion of warm-up of the engine 12, and others.

For example, immediately after the engine 12 is started up, or when an ignition switch of an automobile is turned off, and thus the engine 12 is stopped, it is configured that the coolant liquid does not circulate in the coolant circulating passages 16. For example, in the case in which the exhaust heat recovery structure 10 is applied to an automobile such as a hybrid vehicle, it is configured that the coolant liquid does not circulate in the coolant circulating passages 16 when the engine 12 is stopped because of an intermittent operation of the engine 12.

With the above configuration, the heat exchange portion 30 carries out heat exchange between the exhaust gas having flowed in from the piping part 20 of the exhaust pipe 13 through the inlet 32A, and the coolant liquid, and the exhaust gas having been heat-exchanged with the coolant liquid is brought to flow out through the outlet 32B to the piping part 20 (see FIG. 2).

As shown in FIG. 2, the upstream section 22 of the piping part 20 is provided with a changeover valve 18 that changes over a flow condition of the exhaust gas between a condition in which the exhaust gas flows through the piping part 20 of the exhaust pipe 13 and a condition in which the exhaust gas flows through the heat exchange portion 30 (tubular part 32). The changeover valve 18 is supported by the piping part 20 so as to be turnable (swingable) between a position (a position indicated by solid lines in FIG. 2) to close a flow passage of the piping part 20 and a position (a position indicated by two-dot chain lines in FIG. 2) to close the piping part 20 from the inlet 32A. A rotary shaft 18A of the changeover valve 18 projects outward of the piping part 20. The rotary shaft 18A is rotated by an actuator 19 so as to operate the changeover valve 18. As the actuator 19, a thermo-actuator or a solenoid that is configured to drive in accordance with a temperature of the coolant liquid is used. As a bearing or the like for an operating part of the actuator 19, a resin material is used. In each of the drawings, the actuator 19 is roughly and schematically illustrated.

Figure 3:
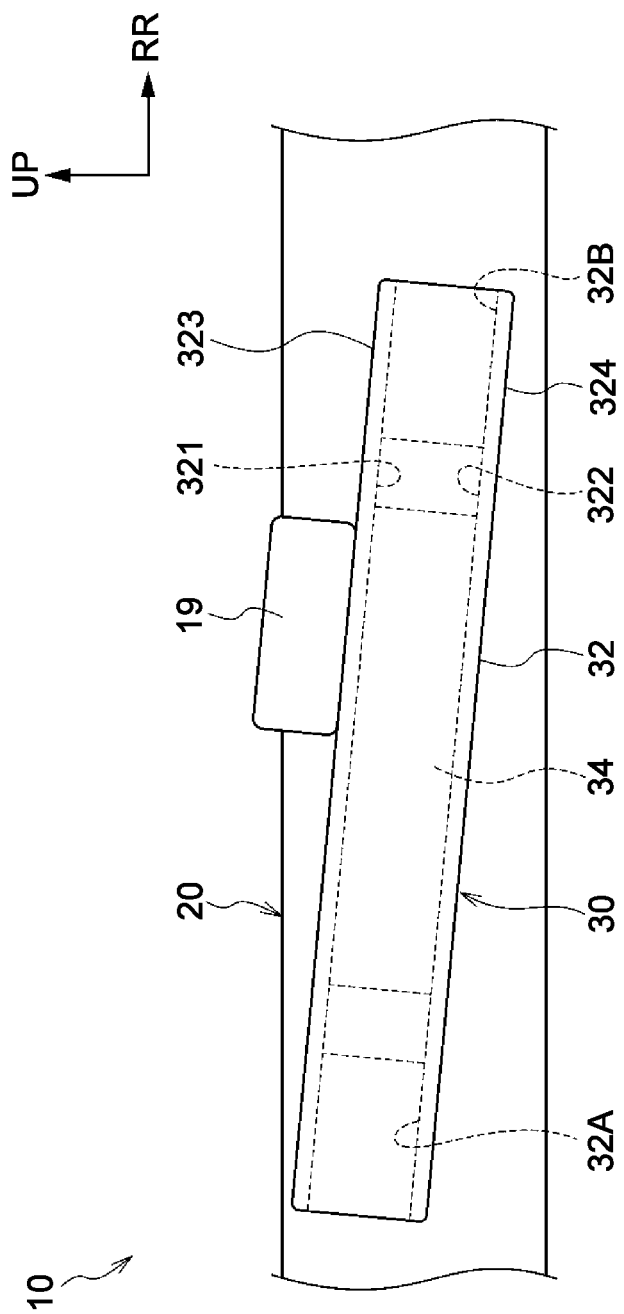
FIG. 3 is a side view schematically showing the exhaust heat recovery structure according to the first embodiment.

In this case, as shown in FIG. 3, in the present embodiment, a height of the heat exchange portion 30 (the tubular part 32) is set to be lowered from the inlet 32A toward the outlet 32B. Specifically, the heat exchange portion 30 (the tubular part 32) has an inclination gradually inclined downward from the inlet 32A toward the outlet 32B.

The tubular part 32 has a constant thickness in the longitudinal direction, and heights of an upper inner surface 321 and a lower inner surface 322 of the tubular part 32 are lowered from the inlet 32A toward the outlet 32B. Note that the "upper inner surface 321" and the "lower inner surface 322" of the tubular part 32 respectively denote "an upper surface which locates inside of the tubular part 32" and "a lower surface which locates inside of the tubular part 32".

In addition, heights of an upper outer surface 323 and a lower outer surface 324 of the tubular part 32 are lowered from the inlet 32A toward the outlet 32B. Note that the "upper outer surface 323" of the tubular part 32 denotes an "upper outer (outside) surface" of the tubular part 32, that is, an "upper surface which locates outside of the tubular part 32". The "lower outer surface 324" of the tubular part 32 denotes a "lower outer (outside) surface" of the tubular part 32, that is a "lower surface which locates outside of the tubular part 32".

Figure 4:
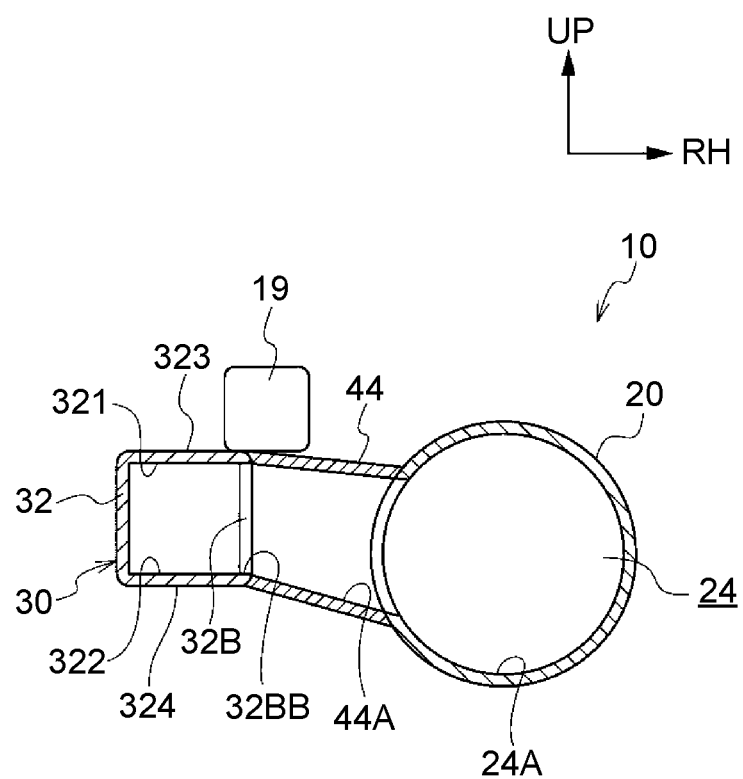
FIG. 4 is a sectional view schematically showing the exhaust heat recovery structure according to the first embodiment, as viewed from the rear to the front (a sectional view taken along line 4-4 in FIG. 2)

As shown in FIG. 4, the rear combined part 44 has an inclination inclined downward from the tubular part 32 toward the piping part 20. The rear combined part 44 may have such an inclination that at least a lower surface 44A is inclined downward from the tubular part 32 toward the piping part 20. The "lower surface 44A" of the rear combined part 44 denotes "a lower surface which locates inside of the rear combined part 44". The front combined part 42 is configured in the same manner as that of the rear combined part 44. That is, the front combined part 42 has an inclination inclined downward from the tubular part 32 toward the piping part 20.

In this manner, the rear combined part 44 has an inclination inclined downward from the tubular part 32 toward the piping part 20, and a lower surface 24A of the downstream section 24 (one example of a communication part) in the piping part 20 is thereby located more downward than a lowermost portion 32BB of the outlet 32B. The "lowermost portion" denotes a "portion located at a lowermost position".

In addition, the actuator 19 is disposed on the upper outer surface 323 on the outlet 32B side in the heat exchange portion 30 (the tubular part 32) (see FIG. 2 and FIG. 3). Specifically, the actuator 19 is located above the heat exchanger 34 on the downstream side. The actuator 19 is disposed on the upper outer surface 323 on the right side of the tubular part 32 (see FIG. 2 and FIG. 4).

Next, the operation and effect of the first embodiment will be described. In the exhaust heat recovery structure 10, when the changeover valve 18 is changed over by the actuator 19 to a position at which the flow passage of the piping part 20 is closed (at a position indicated by the solid lines in FIG. 2), the exhaust gas in the piping part 20 flows through the front combined part 42 and the inlet 32A into the heat exchange portion 30 (the tubular part 32). The exhaust gas having flowed into the heat exchange portion 30 (the tubular part 32) is subjected to the heat exchange with the coolant liquid in the heat exchanger 34. Through this, the heat of the exhaust gas is recovered. The exhaust gas having been heat-exchanged with the coolant liquid flows through the outlet 32B of the heat exchange portion 30 and the rear combined part 44 to the piping part 20.

Here, in the exhaust heat recovery structure 10, as shown in FIG. 3, the height of the heat exchange portion 30 (the tubular part 32) is set to be lowered from the inlet 32A toward the outlet 32B. Specifically, a height of the lower inner surface 322 of the tubular part 32 is lowered from the inlet 32A toward the outlet 32B.

Hence, if the exhaust gas is condensed and condensed water is thereby generated inside the heat exchange portion 30 (the tubular part 32), the condensed water flows from the inlet 32A side toward the outlet 32B side at which the height of the lower inner surface 322 is lowered, and is then discharged via the rear combined part 44 to the piping part 20. Accordingly, the condensed water is unlikely to be collected inside the heat exchange portion 30.

In addition, according to the exhaust heat recovery structure 10, as aforementioned, the condensed water flows from the inlet 32A side of the heat exchange portion 30 toward the outlet 32B thereof. That is, the flow direction of the condensed water in the heat exchange portion 30 and the flow direction of the exhaust gas in the heat exchange portion 30 are set to be the same direction. Through this, the condensed water generated inside the heat exchange portion 30 becomes likely to be discharged by the flow of the exhaust gas. Accordingly, the condensed water becomes unlikely to be collected inside the heat exchange portion 30.

Furthermore, according to the exhaust heat recovery structure 10, as shown in FIG. 4, the lower surface 24A of the downstream section 24 in the piping part 20 is located more downward than the lowermost portion 32BB of the outlet 32B.

Because of this, the condensed water more easily flows from the outlet 32B of the heat exchange portion 30 to the piping part 20, and thus the condensed water is unlikely to be collected inside the heat exchange portion 30 including the lowermost portion 32BB of the outlet 32B.

As aforementioned, because the condensed water is unlikely to be collected inside the heat exchange portion 30, the gas flow passage through which the exhaust gas flows in the heat exchanger 34 is suppressed from being clogged up with the condensed water, thus enhancing the heat exchange efficiency of the heat exchanger 34. In addition, since the condensed water is unlikely to be collected inside the heat exchange portion 30, to thereby suppress corrosion of the tubular part 32 by the condensed water.

Furthermore, according to the exhaust heat recovery structure 10, as shown in FIG. 2, the changeover valve 18 is disposed in the upstream section 22 in the piping part 20. In this case, since the height of the lower inner surface 322 is set to be higher at the inlet 32A of the heat exchange portion 30 than at the outlet 32B of the heat exchange portion 30, the condensed water is unlikely to flow from the inlet 32A of the heat exchange portion 30 to the upstream section 22 in the piping part 20. Accordingly, the changeover valve 18 disposed in the upstream section 22 in the piping part 20 is unlikely to be corroded by the condensed water.

According to the exhaust heat recovery structure 10, the actuator 19 is disposed on the upper outer surface 323 at a position closer to the outlet 32B (at a rearward position) in the heat exchange portion 30 (the tubular part 32) (see FIG. 3 and FIG. 4). In this case, since the height of the upper outer surface 323 located on the outlet 32B side of the heat exchange portion 30 is lower than the height of the upper outer surface 323 located on the inlet 32A side of the heat exchange portion 30, a space is formed above the upper outer surface 323 located on the outlet 32B side. The space above the upper outer surface 323 on the outlet 32B side can be utilized for placing the actuator 19 therein, to thus enhance the space efficiency.

In this manner, since the actuator 19 is disposed on the upper outer surface 323 located on the outlet 32B side in the heat exchange portion 30 (the tubular part 32), jumping stones, coming from a downward direction caused by traveling of the vehicle, is suppressed from reaching the actuator 19, thus reducing damages on the actuator 19 caused by such jumping stones.

Figure 5:
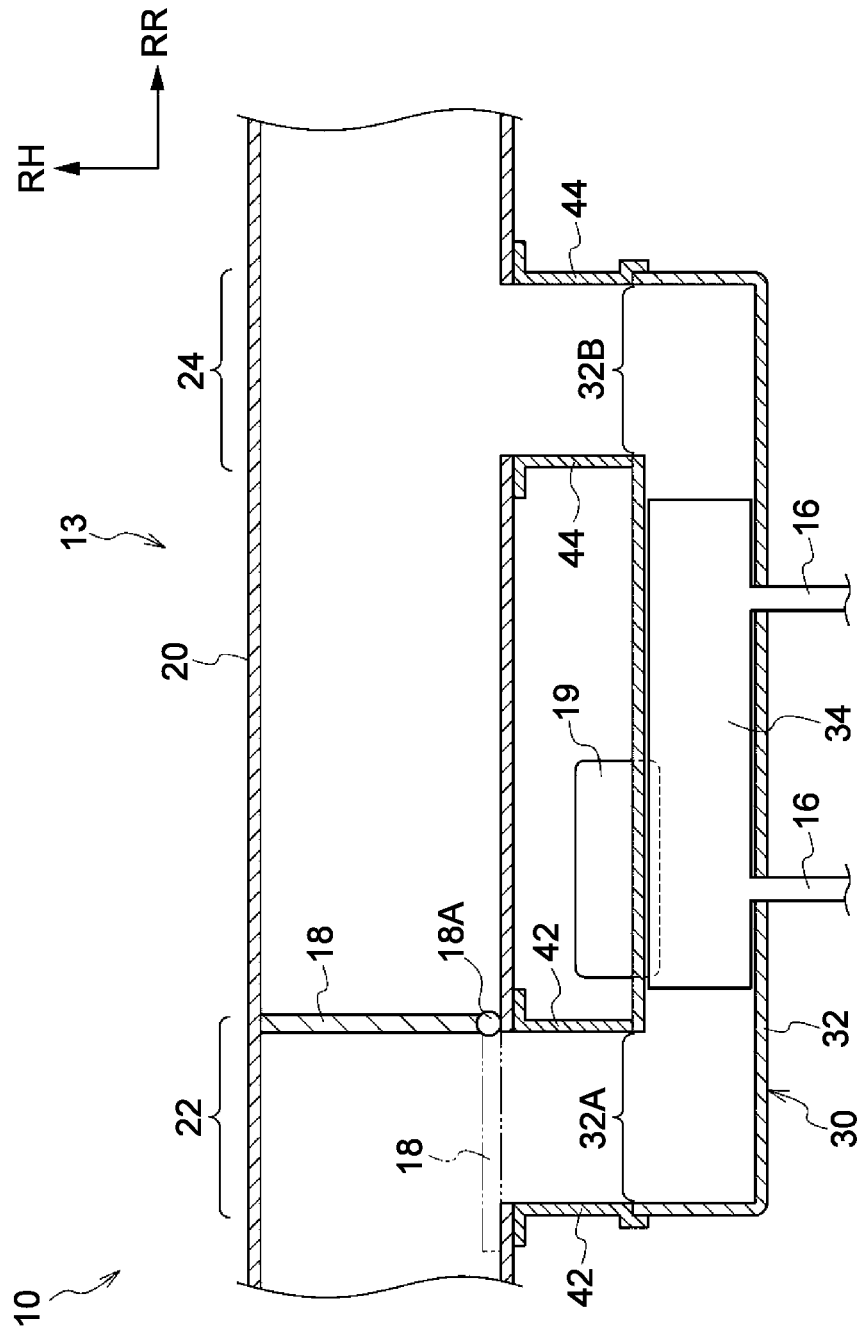
FIG. 5 is a plan sectional view schematically showing the exhaust heat recovery structure according to a variation of the first embodiment.
Figure 6:
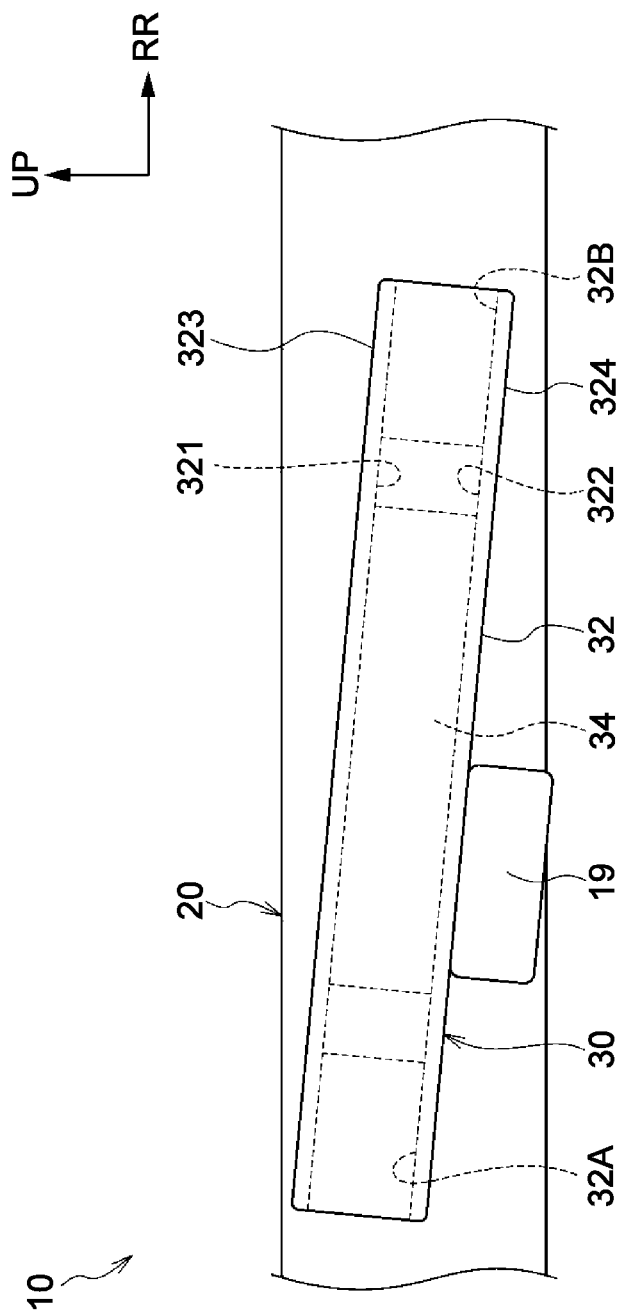
FIG. 6 is a side view schematically showing the exhaust heat recovery structure according to the variation of the first embodiment.

Next, a variation of the arrangement of the actuator 19 will be described. In the above first embodiment, the actuator 19 is disposed on the upper outer surface 323 located on the outlet 32B side in the heat exchange portion 30 (the tubular part 32), but the arrangement is not limited to this. For example, as shown in FIG. 5 and FIG. 6, the actuator 19 may be disposed on the lower outer surface 324 located on the inlet 32A side of the heat exchange portion 30 (the tubular part 32). Note that the actuator 19 is disposed on the lower outer surface 324 on the right side of the tubular part 32 (see FIG. 5).

In this case, since the height of the lower outer surface 324 located on the inlet 32A side of the heat exchange portion 30 is higher than the height of the lower outer surface 324 located on the outlet 32B side of the heat exchange portion 30, a space is formed below the lower outer surface 324 located on the inlet 32A side. The space below the lower outer surface 324 located on the inlet 32A side can be utilized for placing the actuator 19 therein, to thus enhance the space efficiency.

In this manner, since the actuator 19 is placed on the lower outer surface 324 on the inlet 32A side of the heat exchange portion 30 (the tubular part 32), traveling wind during traveling of the vehicle collides against the actuator 19. Herein, the actuator 19 is formed of a resin material, and is thus likely to be deteriorated by heat of the exhaust gas; but the actuator 19 can be cooled when the traveling wind during traveling of the vehicle collies against the actuator 19, thereby suppressing deterioration of the resin material.

Next, another variation of the first embodiment will be described. In the first embodiment, the respective heights of the upper inner surface 321, the lower inner surface 322, the upper outer surface 323, and the lower outer surface 324 are lowered from the inlet 32A toward the outlet 32B, but they are not limited to this. For example, the respective heights of the upper inner surface 321, the upper outer surface 323, and the lower outer surface 324 of the tubular part 32 may be constant from the inlet 32A toward the outlet 32B, and the height of the lower inner surface 322 of the tubular part 32 may be lowered from the inlet 32A toward the outlet 32B. That is, at least the lower inner surface 322 of the tubular part 32 may be lowered from the inlet 32A toward the outlet 32B.

In the first embodiment, the heat exchange portion 30 is arranged at the lateral position of the piping part 20, but the arrangement of the heat exchange portion 30 is not limited to this, and the heat exchange portion 30 may be arranged at an upper position of the piping part 20.

In the first embodiment, as the heating medium, the coolant liquid is used, but the heating medium is not limited to this. As the heating medium, for example, an ATF fluid or a CTV fluid may be used, and a fluid such as a liquid and a gas used for the heat exchange can widely be applied.

Next, a configuration of an exhaust heat recovery structure 200 according to the second embodiment will be described. Components different from those of the above exhaust heat recovery structure 10 will be described, and the same reference numerals will be added to components having the same functions as those of the first embodiment, and description thereof will be omitted.

Figure 7:
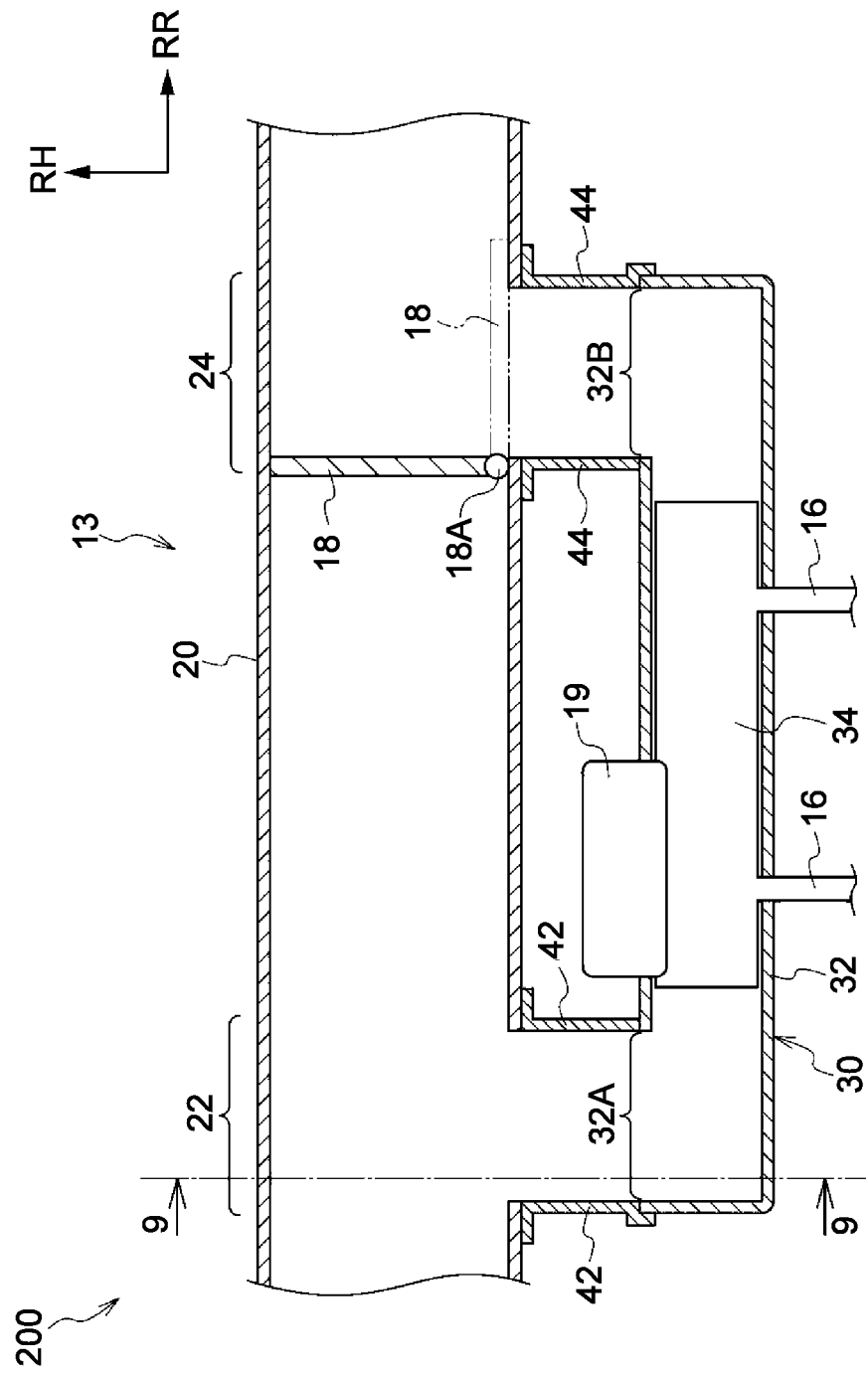
FIG. 7 is a plan sectional view schematically showing an exhaust heat recovery structure according to a second embodiment.

In the exhaust heat recovery structure 200, as shown in FIG. 7, the downstream section 24 in the piping part 20 is provided with the changeover valve 18 that changes over the flow condition of the exhaust gas between the condition in which the exhaust gas flows through the piping part 20 of the exhaust pipe 13 and the condition in which the exhaust gas flows through the heat exchange portion 30 (the tubular part 32). The changeover valve 18 is supported by the piping part 20 in such a manner as to be turnable (swingable) between a position to close the flow passage of the piping part 20 (a position indicated by solid lines in FIG. 7), and a position to close the piping part 20 from the outlet 32B (a position indicated by two-dot chain lines in FIG. 7).

Figure 8:
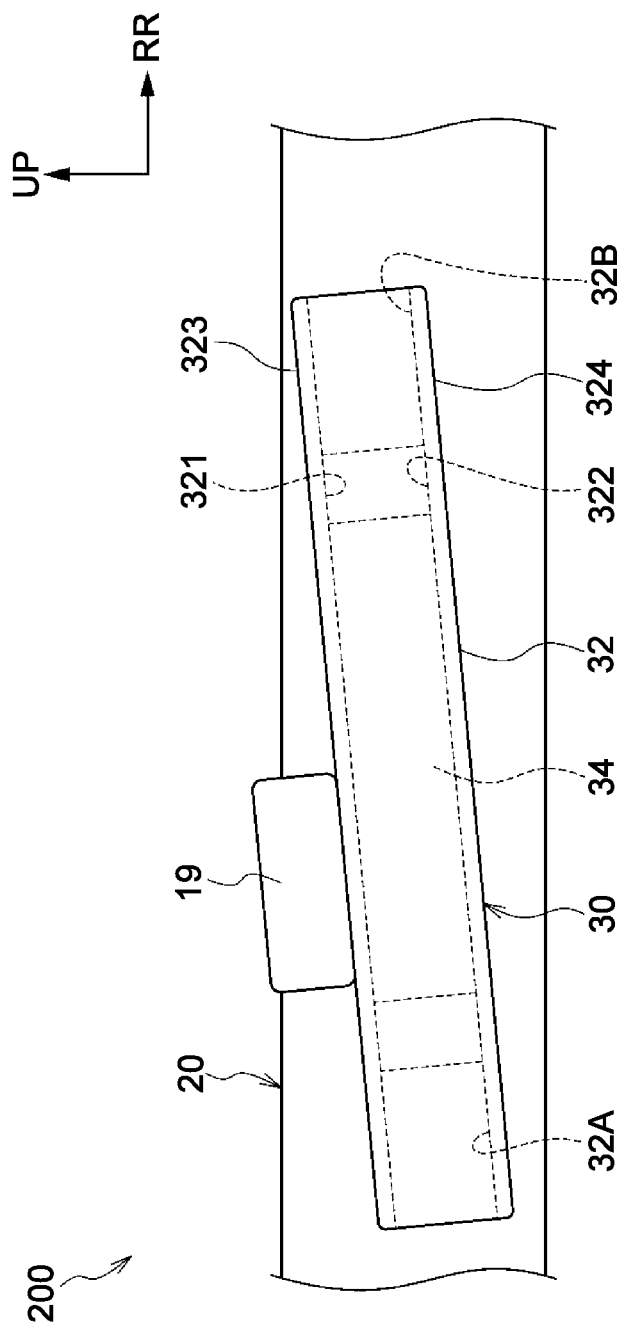
FIG. 8 is a side view schematically showing the exhaust heat recovery structure according to the second embodiment.

In this case, in the present embodiment, as shown in FIG. 8, the height of the heat exchange portion 30 (the tubular part 32) is set to be lowered from the outlet 32B toward the inlet 32A. Specifically, the heat exchange portion 30 (the tubular part 32) has an inclination gradually inclined downward from the outlet 32B toward the inlet 32A.

The tubular part 32 has a constant thickness in the longitudinal direction, and the respective heights of the upper inner surface 321 and the lower inner surface 322 of the tubular part 32 are set to be lowered from the outlet 32B toward the inlet 32A. In addition, the respective heights of the upper outer surface 323 and the lower outer surface 324 of the tubular part 32 are lowered from the outlet 32B toward the inlet 32A.

Figure 9:
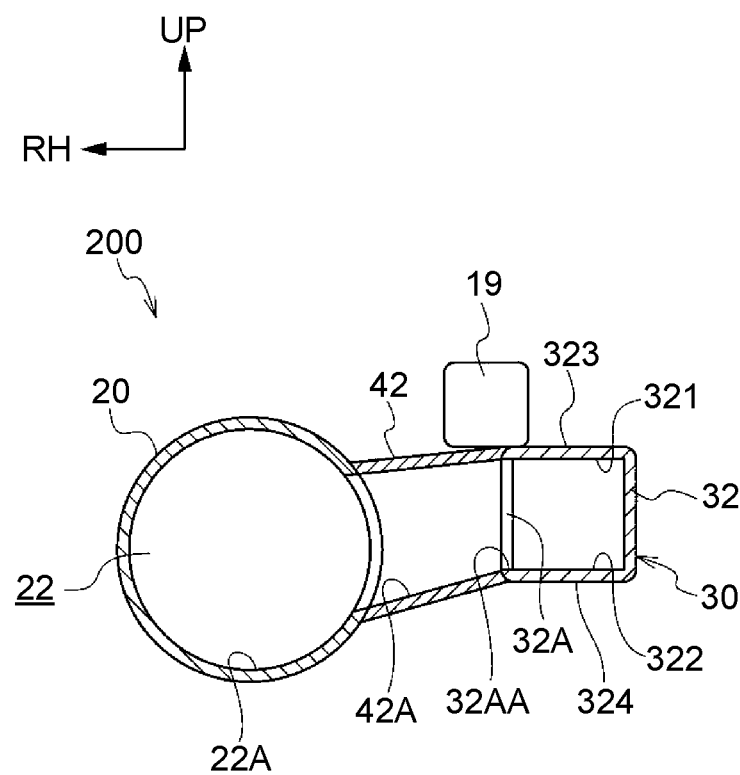
FIG. 9 is a sectional view schematically showing the exhaust heat recovery structure according to the second embodiment, as viewed from the rear to the front (a sectional view taken along line 9-9 in FIG. 7)

As shown in FIG. 9, the front combined part 42 has an inclination inclined downward from the tubular part 32 toward the piping part 20. The front combined part 42 may have such an inclination that at least a lower inner surface 42A is inclined downward from the tubular part 32 toward the piping part 20. The "lower inner surface 42A" of the front combined part 42 denotes a "lower surface which locates inside of the front combined part 42". The rear combined part 44 is configured in the same manner as that of the front combined part 42. That is, the rear combined part 44 has an inclination inclined downward from the tubular part 32 toward the piping part 20.

In this manner, since the front combined part 42 has an inclination inclined downward from the tubular part 32 toward the piping part 20, a lower surface 22A of the upstream section 22 (one example of a communication part) in the piping part 20 is located more downward than a lowermost portion 32AA of the inlet 32A. The "lowermost portion" denotes a "portion located at a lowermost position".

In addition, the actuator 19 is disposed on the upper outer surface 323 located on the inlet 32A side of the heat exchange portion 30 (the tubular part 32) (see FIG. 7 and FIG. 8). Specifically, the actuator 19 is located above the heat exchanger 34 on the upstream side. The actuator 19 is disposed on the upper outer surface 323 on the right side of the tubular part 32 (see FIG. 7 and FIG. 9).

Next, the operation and effect of the second embodiment will be described. In the exhaust heat recovery structure 200, when the changeover valve 18 is changed over by the actuator 19 to the position to close the flow passage of the piping part 20 (the position indicated by the solid lines in FIG. 7), the exhaust gas in the piping part 20 flows through the heat exchange portion 30 (the tubular part 32). Specifically, the exhaust gas in the piping part 20 flows through the front combined part 42 and the inlet 32A into the heat exchange portion 30 (the tubular part 32), and is subjected to the heat exchange with the coolant liquid in the heat exchanger 34. With this, the heat of the exhaust gas is recovered. The exhaust gas after being heat-exchanged with the coolant liquid flows out through the outlet 32B of the heat exchange portion 30 and the rear combined part 44 to the piping part 20.

In this case, in the exhaust heat recovery structure 10, as shown in FIG. 8, the height of the heat exchange portion 30 (the tubular part 32) is lowered from the outlet 32B toward the inlet 32A. Specifically, the height of the lower inner surface 322 of the tubular part 32 is lowered from the outlet 32B toward the inlet 32A.

Hence, if the exhaust gas is condensed and condensed water is thereby generated inside the heat exchange portion 30 (the tubular part 32), the condensed water flows from the outlet 32B side toward the inlet 32A side where the height of the lower inner surface 322 is lowered, and is discharged via the front combined part 42 to the piping part 20. Accordingly, the condensed water is unlikely to be collected inside the heat exchange portion 30.

In the present embodiment, the condensed water generated on the upstream side (at a frontward position) of the gas flow direction in the heat exchange portion 30 flows toward the inlet 32A located upstream in the gas flow direction, which is close to the condensed water generated position, and is discharged through the inlet 32A to the piping part 20. Hence, compared with the case in which the condensed water flows toward the outlet 32B, the condensed water generated on the upstream side in the gas flow direction of the heat exchange portion 30 is more likely to be discharged to the piping part 20. Accordingly, in the present embodiment, in particular, the condensed water generated on the upstream side in the gas flow direction of the heat exchange portion 30 is unlikely to be collected inside the heat exchange portion 30.

In addition, as shown in FIG. 9, according to the exhaust heat recovery structure 200, the lower surface 22A of the upstream section 22 in the piping part 20 is disposed more downward than the lowermost portion 32AA of the inlet 32A.

Accordingly, since the condensed water is likely to flow from the inlet 32A of the heat exchange portion 30 to the piping part 20, the condensed water is unlikely to be collected inside the heat exchange portion 30 including the lowermost portion 32AA of the inlet 32A.

As aforementioned, since the condensed water is unlikely to be collected inside the heat exchange portion 30, the gas flow passage where the exhaust gas flows in the heat exchanger 34 is suppressed from being clogged up with the condensed water, to thereby enhance the heat exchange efficiency of the heat exchanger 34. In addition, since the condensed water is unlikely to be collected inside the heat exchange portion 30, it is possible to suppress corrosion of the tubular part 32 due to the condensed water.

Furthermore, according to the exhaust heat recovery structure 200, as shown in FIG. 7, the changeover valve 18 is disposed in the downstream section 24 in the piping part 20. In this case, the height of the lower inner surface 322 at the outlet 32B of the heat exchange portion 30 is set to be higher than the height of the lower inner surface 322 at the inlet 32A of the heat exchange portion 30, and thus the condensed water is unlikely to flow from the outlet 32B of the heat exchange portion 30 toward the downstream section 24 of the piping part 20. Accordingly, the changeover valve 18 disposed in the downstream section 24 in the piping part 20 is unlikely to be corroded by the condensed water. When the condensed water having flowed from the heat exchange portion 30 to the upstream section 22 in the piping part 20 flows through the downstream section 24, the condensed water comes into contact with the changeover valve 18, but frequencies (time) of the condensed water coming into contact with the changeover valve 18 can be reduced, compared with the case in which the changeover valve 18 is disposed in the upstream section 22.

According to the exhaust heat recovery structure 200, the actuator 19 is disposed on the upper outer surface 323 on the inlet 32A side (at the frontward position) of the heat exchange portion 30 (the tubular part 32) (see FIG. 8 and FIG. 9). In this case, the height of the upper outer surface 323 located on the inlet 32A side of the heat exchange portion 30 is lower than the height of the upper outer surface 323 located on the outlet 32B side of the heat exchange portion 30, and thus a space is formed above the upper outer surface 323 on the inlet 32A side. The space above the upper outer surface 323 located on the inlet 32A side can be utilized for placing the actuator 19 therein, to thus enhance the space efficiency.

In this manner, since the actuator 19 is disposed on the upper outer surface 323 located on the inlet 32A side of the heat exchange portion 30 (the tubular part 32), jumping stones coming from a downward direction due to traveling of the vehicle is unlikely to reach the actuator 19, thus reducing damages on the actuator 19 caused by such jumping stones.

Figure 10:
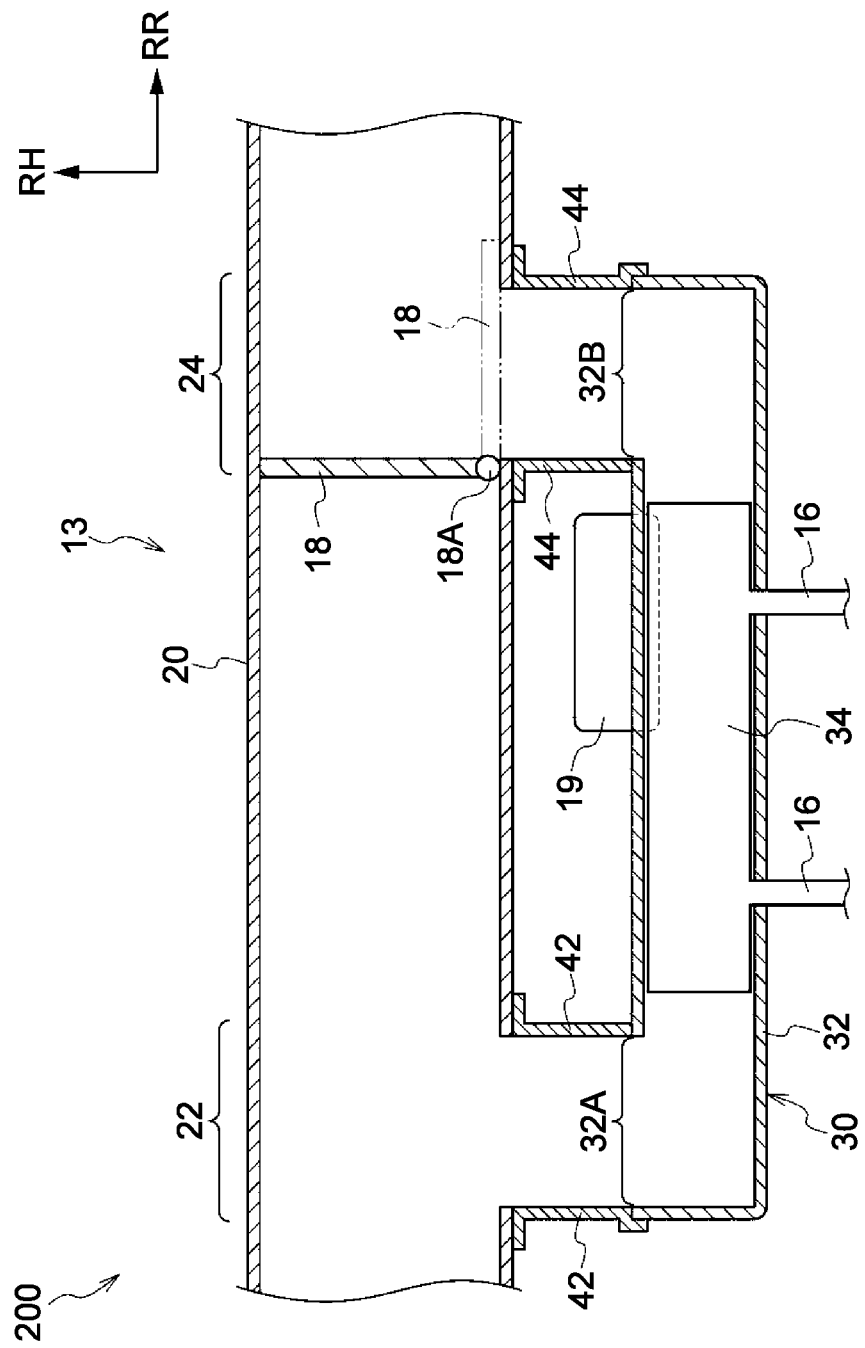
FIG. 10 is a plan sectional view schematically showing the exhaust heat recovery structure according to a variation of the second embodiment.
Figure 11:
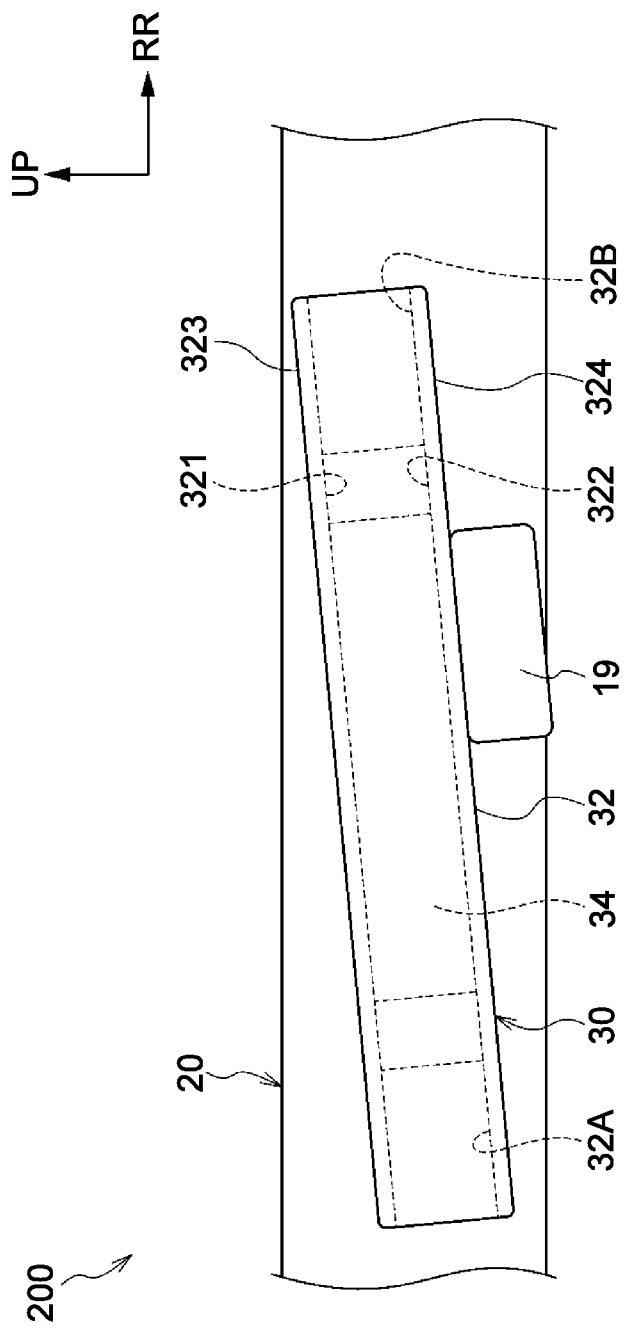
FIG. 11 is a side view schematically showing the exhaust heat recovery structure according to the variation of the second embodiment.

Next, a variation of the arrangement of the actuator 19 will be described. In the aforementioned second embodiment, the actuator 19 is disposed on the upper outer surface 323 located on the inlet 32A side of the heat exchange portion 30 (the tubular part 32), but the arrangement is not limited to this. For example, as shown in FIG. 10 and FIG. 11, the actuator 19 may be arranged on the lower outer surface 324 located on the outlet 32B side of the heat exchange portion 30 (the tubular part 32). The actuator 19 is arranged on the lower outer surface 324 on the right side of the tubular part 32 (see FIG. 10).

In this case, the height of the lower outer surface 324 located on the outlet 32B side of the heat exchange portion 30 is higher than the height of the lower outer surface 324 located on the inlet 32A side of the heat exchange portion 30, and thus a space is formed below the lower outer surface 324 on the outlet 32B side. The space below the lower outer surface 324 on the outlet 32B side can be utilized for placing the actuator 19 therein, to thus enhance the space efficiency.

In this manner, since the actuator 19 is disposed on the lower outer surface 324 on the outlet 32B side of the heat exchange portion 30 (the tubular part 32), traveling wind during traveling of the vehicle collides against the actuator 19. In this case, the actuator 19 is formed of a resin material, and is thus likely to be deteriorated by heat of the exhaust gas; but the actuator 19 can be cooled when the traveling wind during traveling of the vehicle collides against the actuator 19, thereby suppressing deterioration of the resin material.

Next, another variation of the second embodiment will be described. In the second embodiment, the respective heights of the upper inner surface 321, the lower inner surface 322, the upper outer surface 323, and the lower outer surface 324 of the tubular part 32 are lowered from the outlet 32B toward the inlet 32A, but they are not limited to this. For example, the respective heights of the upper inner surface 321, the upper outer surface 323, and the lower outer surface 324 of the tubular part 32 may be constant from the outlet 32B toward the inlet 32A, and the height of the lower inner surface 322 may be lowered from the outlet 32B toward the inlet 32A. That is, at least the lower inner surface 322 of the tubular part 32 may be lowered from the outlet 32B toward the inlet 32A.

In addition to the above, in the second embodiment, the heat exchange portion 30 is arranged at the lateral position of the piping part 20, but the arrangement of the heat exchange portion 30 is not limited to this, and the heat exchange portion 30 may be arranged at an upper position of the piping part 20, or the like.

Furthermore, in the second embodiment, as the heating medium, the coolant liquid is used, but the heating medium is not limited to this. As the heating medium, for example, an ATF fluid or a CTV fluid may be used, and a fluid such as a liquid and a gas used for the heat exchange can widely be applied.

The present disclosure is not limited to the aforementioned embodiments, and various modifications, changes, and improvements can be made in a scope without departing from the gist of the disclosure.

What is claimed is:

1. An exhaust heat recovery structure comprising:
   an exhaust pipe configured to allow exhaust gas flowing from an engine to flow through the exhaust pipe, the exhaust pipe including a piping part that is disposed downstream of a catalytic converter; and
   a heat exchange portion including
   a tubular part disposed at a lateral position of the piping part, and
   a heat exchanger disposed inside the tubular part,
   wherein the tubular part includes an inlet communicating with the piping part, and an outlet to compose an exhaust passage bypassing the piping part, the inlet of the tubular part being connected via a front combined part to a lateral portion of an upstream section of the piping part, and the outlet of the tubular part being connected via a rear combined part to a lateral portion of a downstream section of the piping part,
   wherein the tubular part has a lower inner surface, a height of the lower inner surface being lowered from one of the inlet and the outlet toward the other of the inlet and the outlet,
   wherein the heat exchange portion is configured to carry out heat exchange between the exhaust gas flowing in from the exhaust pipe through the inlet and the heat exchanger, and to bring the exhaust gas after being heat-exchanged with the heat exchanger to flow out through the outlet to the exhaust pipe,
   wherein the upstream section of the piping part is provided with a changeover valve supported by the piping part so as to be swingable by a rotary shaft between a first position in which inlet of the tubular part is closed so that the exhaust gas flows through the piping part and a second position in which a flow passage of the piping part is closed so that the exhaust gas flows through the heat exchange portion,
   wherein the heat exchange portion includes an actuator which rotates the rotary shaft of the changeover valve so as to operate the changeover valve, the actuator being disposed on the tubular part, and
   wherein at least one of a lower inner surface of the front combined part and a lower inner surface of the rear combined part is inclined downward from the tubular part toward the piping part.

2. The exhaust heat recovery structure according to claim 1, wherein a lower surface of a section of the exhaust pipe communicating with the other of the inlet and the outlet is disposed more downward than a lowermost portion of the other of the inlet and the outlet.

3. The exhaust heat recovery structure according to claim 1, wherein a height of an upper outer surface of the tubular part is lowered from the one of the inlet and the outlet toward the other of the inlet and the outlet, the actuator being disposed on the upper outer surface at the position closer to the other of the inlet and the outlet of the tubular part.

4. The exhaust heat recovery structure according to claim 1, wherein a height of a lower outer surface of the tubular part is lowered from the one of the inlet and the outlet toward the other of the inlet and the outlet, the actuator being disposed on the lower outer surface at the position closer to the one of the inlet and the outlet of the tubular part.

5. The exhaust heat recovery structure according to claim 1, wherein a height of the heat exchange portion is lowered from the inlet toward the outlet.

6. The exhaust heat recovery structure according to claim 1, wherein a height of the heat exchange portion is lowered from the outlet toward the inlet.

7. The exhaust heat recovery structure according to claim 1, wherein the heat exchange portion includes the tubular part presenting a constant thickness in a longitudinal direction.

8. The exhaust heat recovery structure according to claim 1, wherein the exhaust passage is parallel to the piping part.

9. The exhaust heat recovery structure according to claim 1, wherein the rotary shaft projects outward of the piping part.

\* \* \* \* \*